Nov. 25, 1958 R. WILSON ET AL 2,862,143
COMBINED BEAM-INTENSITY AND SWEEP-CONTROL APPARATUS FOR A CATHODE-RAY TUBE
Original Filed Nov. 29, 1954
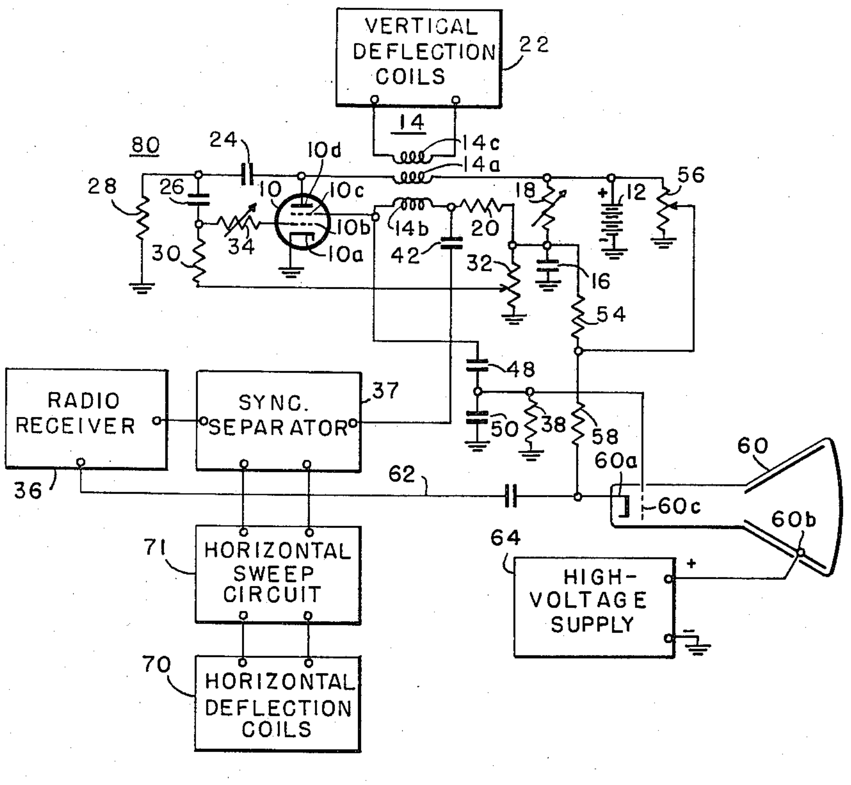

United States Patent Office 2,862,143

Patented Nov. 25, 1958

2,862,143

COMBINED BEAM-INTENSITY AND SWEEP-CONTROL APPARATUS FOR A CATHODE-RAY TUBE

Rex Wilson, Glenview, and Howard Van Jepmond, Evanston, Ill., assignors to Hazeltine Research, Inc., Chicago, Ill., a corporation of Illinois Application July 19, 1956, Serial No. 598,846

9 Claims. (Cl. 315—22)

GENERAL

This application is a continuation of applicants' application Serial No. 471,699, filed November 29, 1954, now forfeited, for "Receiver Circuit," and assigned to the same assignee as the present invention.

The present invention relates to a combined beam-intensity and sweep-control apparatus for a cathode-ray tube and, more particularly, to such an apparatus for use in a television receiver wherein the intensity of the image on the cathode-ray tube viewing screen may be adjusted without altering the size of the image.

In the operation of cathode-ray tubes in television receivers, it is necessary to adjust the average intensity of the cathode-ray tube beam to accommodate variations in tube characteristics, the tastes of the user, and variations in signal conditions. However, with magnetic cathode-ray beam deflection, such variations in the ray beam intensity commonly cause a change in the accelerating potential and thence in the size of the image since the velocity of the cathode-ray beam—and hence the deflection at any given magnetic field strength—is altered.

It is the object of the present invention, therefore, to overcome this difficulty by providing a new and improved combined beam-intensity and sweep-control apparatus for a cathode-ray tube wherein adjustment of the intensity of the cathode-ray beam gives rise to a compensating change in the magnitude of the magnetic field which sweeps the ray beam and without altering the synchronized condition of the sweep oscillator.

A more specific object of the present invention is to provide for use in a television receiver a combined beam-intensity and sweep-control apparatus which may operate at a low direct-current voltage—such as 150 volts—and in which adjustments in the intensity of the cathode-ray beam do not alter the vertical size or extent of the image.

It is a further object of the present invention to provide a combined beam-intensity and sweep-control apparatus for a cathode-ray tube embodying features of construction, combination, and arrangement whereby low cost, reliability, simplicity, and effective operation are achieved in a manner rendering it especially suitable for use in home television receivers.

It is an additional object of the present invention to provide a new and improved combined beam-intensity and vertical or field sweep-control apparatus for a television receiver.

In accordance with a particular form of the invention, a combined beam-intensity and vertical sweep-control apparatus for a cathode-ray tube having beam-intensity control means and a viewing screen comprises means for applying an adjustable voltage to the beam-intensity control means selectively to adjust the average intensity of the cathode-ray beam. The apparatus also includes a vertical sweep circuit having a voltage-responsive sweep-control element for developing a sweep wave to sweep the cathode-ray beam over the viewing screen. The apparatus further includes means coupled between the aforesaid applying means and the voltage-responsive element for applying to the latter a voltage representative of that adjustable voltage to vary the magnitude of the sweep wave inversely with the average intensity of the cathode-ray beam.

For a better understanding of the present invention, together with other and further objects thereof, reference is had to the following description taken in connection with the accompanying drawings, and its scope will be pointed out in the appended claims.

In the drawing, there is represented a circuit diagram, partially schematic, of a television receiver including a combined beam-intensity and sweep-control apparatus constructed in accordance with a particular form of the present invention.

*Description of combined beam-intensity and sweep-control apparatus*

Referring now to the drawing, there is represented a sweep circuit 80 including an electron tube 10 having a cathode 10*a*, a control electrode 10*b*, a screen-electrode grid 10*c*, and an anode 10*d*. This tube may, for example, be a 25L6 beam-power amplifier and forms a portion of a vertical sweep circuit or oscillator of the kind described and claimed in our copending application Serial No. 457,724, filed September 22, 1954, entitled "Cathode Ray Tube Beam Sweep Oscillator," and assigned to the same assignee as the present invention. The anode 10*d* and the screen electrode 10*c* of the tube 10 are connected to a unidirectional voltage source 12 through the windings 14*a* and 14*b* of a transformer 14, respectively. These windings are poled so that rising anode current in the positive direction in winding 14*a* gives rise to a positive voltage at the screen electrode 10*c*, thus forming a positive feed-back system including the cathode 10*a*, the screen electrode 10*c*, and the anode 10*d*. The screen electrode 10*c* constitutes a voltage-responsive sweep-control element for the sweep circuit 80.

The condenser or capacitor 16 serves to maintain relatively constant the unidirectional voltage at the source side of the winding 14*b*. However, resistance 20 permits some excursions from this condition at the actual winding terminal. This is important since, as hereafter described, the synchronizing wave is applied to the tube 10 through this winding.

The vertical deflection coils 22 for the cathode-ray tube 60 of the television receiver are represented diagrammatically and are connected to a tertiary winding 14*c* of the transformer 14. Since, as is described in detail hereafter, the current flow in windings 14*a* and 14*b* is rapidly changing when the vertical sweep circuit 80 is in operation, a correspondingly changing voltage wave is induced in winding 14*c* and the requisite sweep-current wave flows through the vertical deflection coils 22. These coils straddle the neck of the cathode-ray tube 60 in usual fashion and deflect the ray beam from its axial direction of travel to an extent determined by the value of the current. Horizontal deflection coils 70, which are represented in block form, are connected through a horizontal sweep circuit 71 to an output circuit of the sync separator 37 and straddle the neck of the cathode-ray tube 60 in a conventional manner. Coils 22 and 70 produce the usual scanning fields thereby to deflect the cathode-ray beam of tube 60 in two directions normal to each other to trace a rectilinear scanning pattern on the screen of the tube and thereby reconstruct the translated picture.

Capacitors 24 and 26, acting in conjunction with resistors 28 and 30 and potentiometer 32, form a negative feed-back circuit from the anode 10*d* to the control electrode 10*b*. This path extends through a variable resistance 34. As described hereafter, this feed-back path serves to swing control electrode 10*b* positively and then negatively during the synchronizing voltage pulse. The capacitors thereafter discharge linearly to provide the linear ray beam sweep wave.

Negative synchronizing pulses are applied to the junction of resistance 20 and winding 14*b*. These pulses are derived from the radio receiver 36 which includes radio-frequency and intermediate-frequency amplifiers and demodulators as required to derive the amplitude-modulated video and synchronizing-signal components of the modulated television carrier wave signal. The resulting composite signal is applied in conventional fashion to the sync separator 37 which discards the video components leaving a synchronizing signal containing short horizontal synchronizing pulses at a repetition rate of about 15,000 pulses per second for application to unit 71 and longer vertical synchronizing pulses at a repetition rate of 60 per second for application to the vertical sweep circuit 80. This composite signal is applied to the junction of resistance 20 and winding 14*b* through the capacitor 42 to trigger the sweep circuit 80 as hereinafter described.

A potentiometer 56 is connected across the positive voltage source 12 and has its movable arm connected to the junction of resistance 18 and capacitor 16 through the resistance 54 as shown. In addition, the movable arm of this potentiometer is connected through resistor 58 to the cathode 60*a* of the cathode-ray tube 60. This cathode also receives the video signal from the receiver 36 as shown diagrammatically by the conductor 62. A fixed accelerating potential for the cathode-ray tube beam is supplied by the high-voltage supply 64 which is grounded at its negative terminal and at its positive terminal is connected to the accelerating electrode 60*b* of the cathode-ray tube 60.

Return sweep blanking potential is applied to the control electrode 60*c* of the cathode-ray tube 60. This circuit may be traced to the junction of capacitors 50 and 48 and through the latter capacitor to the screen electrode 10*c* of the tube 10. Resistance 38 provides a discharge path for capacitor 50. The operation of this circuit in providing retrace blanking is explained in the copending application of the present inventors Serial No. 480,079, filed January 6, 1955, now Patent No. 2,760,108 entitled "Cathode Ray Tube Blanking Circuit," and assigned to the same assignee as the present invention.

*Operation of combined beam-intensity and sweep-control apparatus*

The operation of the synchronized vertical sweep circuit 80 is described in detail in applicants' copending application Serial No. 457,724. In brief, the negative synchronizing pulses, both horizontal and vertical, from separator 37 appear at capacitor 42. However, the horizontal pulses, with approximately a 15 kilocycle repetition rate and very short durations, do not appear at the screen electrode 10*c* of the tube 10 because of the integrating action of the winding 14*b* in conjunction with the capacitors 48 and 50. The vertical pulses, with a 60 cycle repetition rate and comparatively long durations, do reach the screen electrode 10*c* and thereby cause the sharp negative voltage swing which triggers the oscillator to execute a cycle of operation.

Once the voltage of screen electrode 10*c* begins to fall due to a vertical synchronizing pulse, the positive feedback due to transformer 14 gives rise to an increasing screen-electrode voltage fall which is continued until the anode current is cut off. This action is due to the fact that the decreased anode-current flow due to the fall in screen-electrode voltage passes through the winding 14*a*. Upon anode-current cutoff, the magnetic field in transformer 14 collapses at a rate determined by its natural frequency to induce a voltage in winding 14*b* which drives the voltage at screen electrode 10*c* further in the negative direction, thus completing the positive feed-back cycle and causing build-up of the swing started by the synchronizing pulse.

The positive voltage pulse at the anode due to the anode-current fall is applied to the control electrode 10*b* through capacitors 24 and 26. However, as soon as the control electrode 10*b* swings positive in relation to the cathode 10*a*, the control electrode conducts current and thus holds its own voltage very close to the cathode potential. The capacitors 24 and 26 thus charge through the circuit extending from the anode 10*d* through the capacitors in series to the control electrode 10*b* and thence to the cathode 10*a*. As resistance 34 is comparatively small (that is, less than a megohm) the time constant of this charging circuit is short.

It will be noted that capacitors 26 and 24 act as a capacitance voltage divider. The former may, for example, be about 0.0022 microfarad and the latter about 0.022 microfarad. Thus, capacitor 26 experiences most of the voltage rise during the interval when the anode 10*d* is swinging in the positive direction.

As the anode 10*d* swings positively and the screen electrode 10*c* swings negatively, the ability of the screen electrode to control the anode space current decreases until finally a point is reached wherein control is lost. At this time the voltage of anode 10*d* continues to swing in a positive direction due to collapsing fields and the screen voltage continues to swing in the negative direction until the collapsing fields have dissipated their energy in a half cycle of oscillation at the natural period of the circuit.

As the anode voltage swings sufficiently in the negative direction following this self-oscillatory half cycle, the control electrode 10*b* immediately partakes of the negative swing and moves negatively in relation to the cathode 10*a*. This is due to the fact that at this time control electrode—cathode current ceases, so that the short time-constant charging circuit through the control electrode 10*b* is discontinued. The charge on capacitors 24 and 26 accordingly does not change rapidly and the control electrode executes a rapid and large negative voltage swing from which it thereafter changes slowly as the charge on the capacitors changes.

During the negative swing of the control electrode 10*b*, it takes control of the space current to the anode 10*d*. In other words, when the control-electrode voltage is in the very negative region, the voltage of the screen electrode 10*c* does not significantly affect the cathode-anode space current. At this time, therefore, the system composed of the anode 10*d*, transformer 14, and screen electrode 10*c* is no longer oscillatory and the rapid voltage swing at the anode 10*d* and the control electrode 10*b* is arrested. The voltage at screen electrode 10*c* accordingly tapers out from the rapid rise and rises thereafter only at a relatively slow rate.

At the completion of the negative swing of the anode voltage, the control electrode 10*b* has an initial negative potential due to the charge on capacitors 26 and 24. This charge, particularly that on the capacitor 26, leaks off through resistors 28, 30, and 32, thus causing the control-electrode voltage to increase slowly and the anode current likewise to increase slowly. The anode potential likewise decreases slowly.

By the time the next vertical synchronizing pulse is applied, the control-electrode voltage has risen to a base value wherein it no longer defeats the control exerted by the screen electrode 10*c* over the anode space current. Hence, the application of the synchronizing pulse through the screen winding 14*b* to the screen electrode 10*c* decreases the anode space current to give rise to the cycle of operations above described.

When the movable terminal or tap of the potentiometer 56 is moved toward the positive terminal of the source 12, the cathode 60*a* of cathode-ray tube 60 is likewise made more positive. This increases the negative bias of the control electrode 60c relative to the cathode and, hence, decreases the current of the cathode-ray beam and the intensity of illumination on the viewing screen of the cathode-ray tube 60. This decrease in current lowers the load on the high-voltage supply 64 for the accelerating electrode 60b and so causes this high voltage to rise in value with the result that electrons of the beam are accelerated to a higher velocity and so remain in the deflecting magnetic field for a shorter time. The net effect of higher velocity and shorter time is to cause the deflection in a given magnetic field to vary inversely as the square root of the high voltage, that is, to be lessened by the more positive cathode potential. This effect is well known in the television art. See, for example, page 170, Equation 59, of the text Television Engineering by Donald G. Fink, published in 1952 by the McGraw-Hill Book Company, Inc.

A more positive potential on the cathode 60a, however, causes a more positive potential on the screen electrode 10c due to the connection from the cathode 60a to the screen electrode 10c through resistors 58, 54, 20 and the transformer winding 14b. This more positive potential increases the range of anode current in tube 10 and, hence, the current swing in the vertical deflection coils 22. This compensates for the lessened deflection that would otherwise occur, as described in the preceding paragraph, with the consequence that the extent of the vertical ray beam sweep is maintained at a constant value. The intensity or brilliance of the image can accordingly be varied without disturbing its vertical size.

From the foregoing description and explanation of the operation of the invention, it will be seen that the potentiometer 56 together with resistors 58 and 38 is a means for applying an adjustable voltage to the beam-intensity control means comprising the control electrode and cathode input circuit of the cathode-ray tube 60 selectively to adjust the average intensity of the cathode-ray beam thereof. It will also be clear that the resistors 54 and 20 and the winding 14b comprise a direct-current connection between the applying means or potentiometer 56 and the voltage-responsive element or screen electrode 10c of the sweep circuit 80 for applying to that electrode a voltage representative of the adjustable voltage developed at the tap of the potentiometer to vary the magnitude of the vertical sweep wave supplied to coils 22 in a predetermined or inverse relation with the average intensity of the cathode-ray beam of tube 60. It will further be seen that changes in the average intensity of the cathode-ray beam effected by selective adjustment of the potentiometer 56 undesirably tend to cause changes in the maximum deflection of the cathode-ray beam. However, the resistors 54 and 20 and the winding 14b connected between the screen electrode 10c and the adjustable arm of the potentiometer 56 apply to the screen electrode a voltage having a value dependent on the adjustable voltage furnished by the potentiometer to counteract undesirable changes in the above-mentioned maximum deflection of the cathode-ray beam. It will also be seen that the battery 12, the resistor 18, the condenser 16, the resistor 20, and the winding 14b comprise means for applying a relatively fixed biasing voltage to the screen electrode of tube 10. The resistors 54 and 20 and the winding 14b serve to apply to the screen electrode 10c an additional voltage having a value dependent on the adjustable voltage appearing at the adjustable arm of the potentiometer 56.

In a practical receiver constructed in accordance with the circuit of the drawing, the following circuit values were used:

| | |
|---|---|
| Tube **10** | Type 25L6. |
| Resistance **18** | 18,000 to 68,000 ohms. |
| Capacitor **16** | 10 microfarads. |
| Potentiometer **32** | 97,000 ohms. |
| Resistance **20** | 1,800 ohms. |
| Capacitor **42** | 0.22 microfarad. |
| Capacitor **48** | 0.01 microfarad. |
| Capacitor **50** | 0.022 microfarad. |
| Resistance **38** | 47,000 ohms. |
| Resistance **30** | 2.2 megohms. |
| Resistance **34** | 390,000 to 640,000 ohms. |
| Capacitor **26** | 0.0022 microfarad. |
| Capacitor **24** | 0.022 microfarad. |
| Resistance **28** | 1.8 megohms. |
| Transformer **14** | |
| Anode winding **14a** | 10,000 ohms at 60 cycles with 10 milliamperes. D.-C current. |
| Screen winding **14b** | One-third the turns of the anode winding **14a**. |
| Tertiary winding **14c** | One twenty-fourth the turns of the anode winding **14a**. |
| Voltage of source **12** | 150 volts. |
| Potentiometer **56** | 50,000 ohms. |
| Resistance **54** | 150,000 ohms. |
| Resistance **58** | 220,000 ohms. |
| Cathode-ray tube **60** | 21XP4. |
| Voltage of source **64** | 13 kilovolts. |

The vertical size of the image on the cathode-ray viewing screen can be controlled without varying the intensity of the ray beam by varying the value of the resistance 18. This result is achieved from the fact that, from the standpoint of the oscillator, varying resistance 18 has an effect similar to varying potentiometer 56 but variations in resistance do not substantially alter the voltage at cathode 60a so that the cathode-ray beam is substantially unaffected.

In certain of the appended claims, the expression "initial charge" is used to designate the value of the charge at capacitors 24 and 26 at the instant after the control electrode 10b takes control of the anode-current flow in the tube 10. With respect to anode-current flow, this is the instant at which the saw-tooth portion of the sweep wave begins. The value of this initial charge is determined by the adjustment of potentiometer 56. The expression "base charge" has been used in certain of the claims to designate the charge at capacitors 24 and 26 at the instant the sync pulse on the screen electrode 10c initiates the screen-electrode controlled action to impart the initial charge. Additionally, the term "ultimate control-electrode voltage" is used to designate the voltage towards which the control electrode 10b swings after the initial charge is placed at capacitors 24 and 26. It will be noted that the difference between this ultimate control and actual control-electrode voltage at any instant determines the time rate of change of control-electrode voltage and, hence, the slope of the current wave in the sweep coils.

While there has been described what is at present considered to be the preferred embodiment of this invention, it will be obvious to those skilled in the art that various change and modifications may be made therein without departing from the invention, and it is, therefore, aimed to cover all such changes and modifications as fall within the true spirit and scope of the invention.

What is claimed is:

1. A combined beam-intensity and vertical sweep-control apparatus for a cathode-ray tube having beam-intensity control means and a viewing screen comprising: means for applying an adjustable voltage to the beam-intensity control means selectively to adjust the average intensity of the cathode-ray beam a vertical sweep circuit having a voltage-responsive sweep-control element for developing a sweep wave to sweep the cathode-ray beam over the viewing screen; and means coupled between said applying means and said voltage-responsive element for applying to the latter a voltage representative of said adjustable voltage to vary the magnitude of said sweep wave inversely with the average intensity of the cathode-ray beam.

2. A combined beam-intensity and vertical sweep-control apparatus for a cathode-ray tube having beam-intensity control means and a viewing screen comprising: means for applying an adjustable voltage to the beam-intensity control means selectively to adjust the average intensity of the cathode-ray beam, changes in that intensity undesirably tending to cause changes in the maximum deflection of the cathode-ray beam; a vertical sweep circuit for developing a sweep wave to deflect the cathode-ray beam over the viewing screen and including an electron tube having a screen electrode, a control electrode, and a cathode, the maximum deflection of the cathode-ray beam being dependent on the average voltage between said screen electrode and said cathode, means for applying a saw-tooth control voltage between said control electrode and said cathode, and means for applying a fixed biasing voltage between said screen electrode and said cathode; and means for applying between said screen electrode and said cathode an additional voltage having a value dependent on said adjustable voltage to vary the magnitude of said sweep wave inversely with the average intensity of the cathode-ray beam thereby to counteract undesirable changes in maximum deflection of the cathode-ray beam.

3. A combined beam-intensity and sweep-control apparatus for a cathode-ray tube having beam-intensity control means and a viewing screen comprising: means for applying an adjustable voltage to the beam-intensity control means selectively to adjust the average intensity of the cathode-ray beam, changes in that intensity undesirably tending to cause changes in the maximum deflection of the cathode-ray beam; a sweep circuit for developing a sweep wave to deflect the cathode-ray beam over the viewing screen and including an electron tube having an anode, a screen electrode, a control electrode, and a cathode, the maximum deflection of the cathode-ray beam being dependent on the average voltage between said screen electrode and said cathode, means including a negative feed-back path between said anode and said control electrode for applying a saw-tooth control voltage between said control electrode and said cathode, and means for applying a fixed biasing voltage between said screen electrode and said cathode; and means for applying between said screen electrode and said cathode an additional voltage having a value dependent on said adjustable voltage to counteract undesirable changes in maximum deflection of the cathode-ray beam.

4. A combined beam-intensity and sweep-control apparatus for a cathode-ray tube having beam-intensity control means and a viewing screen comprising: means for applying an adjustable voltage to the beam-intensity control means selectively to adjust the average intensity of the cathode-ray beam, changes in that intensity undesirably tending to cause changes in the maximum deflection of the cathode-ray beam; a sweep circuit for developing a sweep wave to deflect the cathode-ray beam over the viewing screen and including an electron tube having an anode, a screen electrode, a control electrode, and a cathode, the maximum deflection of the cathode-ray beam being dependent on the average voltage between said screen electrode and said cathode, means coupled between said anode, said control electrode, and said cathode for applying a saw-tooth control voltage between said control electrode and said cathode, and means for applying a fixed biasing voltage between said screen electrode and said cathode; and means for applying between said screen electrode and said cathode an additional voltage having a value dependent on said adjustable voltage to counteract undesirable changes in maximum deflection of the cathode-ray beam.

5. A receiver circuit comprising in combination: a cathode-ray tube having a cathode and a viewing screen; a sweep oscillator having an electron tube with cathode, control, screen, and anode electrodes, means to supply positive bias voltage to the anode electrode and an adjustable positive bias voltage to the screen electrode, a transformer having an anode winding interposed between the anode and said means and a screen winding interposed between the screen electrode and said means, said windings being in feed-back relation to define an oscillatory system including the cathode, screen, and anode electrodes, capacitor means connecting the anode and control electrodes, resistance means connecting the control electrode to the screen electrode, resistance means to discharge the capacitor means, and means to apply negative synchronizing pulses to the screen electrode through the screen winding; means to apply the adjustable positive bias voltage of the screen electrode to the cathode of the cathode-ray tube, thereby to vary the average intensity of the cathode-ray beam and the magnitude of the sweep oscillations in unison; and sweep coils coupled to the sweep oscillator and positioned to sweep the cathode-ray beam over the viewing screen.

6. In a receiver circuit for television use, the combination of: a cathode-ray tube having a viewing screen; means to vary the average intensity of the image on the viewing screen; a magnetic deflection coil to sweep the ray beam across the viewing screen; means to energize said coil including an electron tube having control and anode electrodes; a capacitor connected to the control electrode; means to discharge the capacitor; means periodically to charge the capacitor and effective when the charge thereon reaches a predetermined base value; means to energize said coil in accord with the anode current of said tube; and means to increase the initial charge on said capacitor and the rate of discharge of said capacitor in unison as the average intensity of the cathode-ray beam is decreased to maintain constant the extent of the cathode-ray beam sweep.

7. In a receiver circuit for television use, the combination of: a cathode-ray tube having a viewing screen; means to vary the average intensity of the image on the viewing screen; a magnetic deflection coil to sweep the ray beam across the viewing screen; means to energize said coil including an electron tube having control and anode electrodes; a capacitor connected to the control electrode; means to discharge the capacitor; means periodically to charge the capacitor and effective when the charge thereon reaches a predetermined base value; means to energize said coil in accord with the anode current in said tube; means to increase the initial charge on said capacitor and the rate of discharge of said capacitor in unison as the average intensity of the cathode-ray beam is decreased to maintain constant the extent of the cathode-ray beam sweep; and means to vary the rate of discharge of the capacitor independently of the intensity of the cathode-ray beam to establish a synchronized condition.

8. A receiver circuit including in combination: an electron tube having cathode, control, screen, and anode electrodes; a transformer having an anode winding connected to the anode and a screen winding connected to the screen electrode in positive feed-back relation with the anode winding; means to apply positive bias voltage to the anode through the winding connected thereto; bias means to apply adjustable positive bias voltage to the screen electrode through the winding connected thereto; capacitor means connecting the anode and control electrode; resistance means connecting the control electrode to said bias means, whereby adjustment of the same varies the ultimate control-electrode voltage and the screen-electrode bias voltage in unison; means to apply synchronizing pulses to the screen electrode through the screen winding; a cathode-ray tube having a cathode-ray beam; magnetic means to sweep the ray beam in response to the current flow in said electron tube; and means to vary the intensity of the cathode-ray beam in accord with the adjustment of said bias means.

9. In a receiver circuit for television use, the combination of: a cathode-ray tube having a viewing screen; means to very the average intensity of the image on the viewing screen; a magnetic deflection coil operable to sweep the ray beam across the viewing screen; means to energize said coil in a series of saw-tooth current waves; said last means including a capacitor; means to cause current flow through the coil in accord with the charge on the capacitor; means operable when there is a predetermined base charge on the capacitor to impress suddenly a predetermined initial charge thereon; means to vary the capacitor charge from the initial charge to the base charge at a rate determined by the extent the charge departs from an ultimate charge value, thereby varying the slope of the saw-tooth current wave in accord with the peak value thereof; and means to increase the value of the initial charge in unison with decrease in average intensity of the cathode-ray beam to maintain constant the extent of the cathode-ray beam sweep as the average intensity of the ray beam is varied.

References Cited in the file of this patent

UNITED STATES PATENTS

| | | |
|---|---|---|
| 2,458,366 | Fyler | Jan. 4, 1949 |
| 2,517,715 | Rogers | Aug. 8, 1950 |
| 2,561,586 | Montgomery | July 24, 1951 |
| 2,651,739 | Chudleigh, Jr. | Sept. 8, 1953 |
| 2,739,264 | Shreve et al. | Mar. 20, 1956 |